United States Patent Office 2,937,202
Patented May 17, 1960

2,937,202

SUBSTITUTED BENZENESULFONANILIDES

Harold R. Slagh and Kenneth C. Kauer, Midland, Mich., assignors to The Dow Chemical Company, Midland, Mich., a corporation of Delaware No Drawing. Application May 19, 1958
Serial No. 736,008

6 Claims. (Cl. 260—556)

This invention is concerned with novel 2′,4′,5′-trichloro-benzenesulfonanilides and is particularly directed to such compounds having the formula

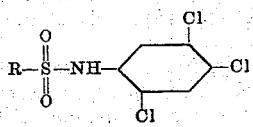

wherein R represents a phenyl, lower alkylphenyl, lower alkoxyphenyl or chlorophenyl radical.

This application is a continuation-in-part of our co-pending application, Serial No. 575,961, filed April 4, 1956, and now abandoned.

The compounds of the invention are crystalline solids, somewhat soluble in many organic solvents and of low solubility in water. The new compounds have been found useful as parasiticides for the control of insect pests and microorganisms. The expression "lower alkyl" as herein employed refers to radicals containing from 1 to 4 carbon atoms, inclusive.

The 2′,4′,5′-trichloro-benzenesulfonanilides may be prepared by reacting 2,4,5-trichloroaniline with a sulfonyl chloride of the formula:

wherein R has the aforementioned significance. The reaction is conveniently carried out in the presence of a hydrogen chloride acceptor such as pyridine, quinoline or an alkali metal hydroxide. Good results are obtained when equimolar proportions of the reactants are employed. On completion of the reaction, the desired product is separated and purified in conventional fashion.

In a preferred method of preparation, equimolar proportions of the sulfonyl chloride and 2,4,5-trichloroaniline are dispersed in water at a temperature of from about 50° to 75° C. and one molar proportion of pyridine or alkali metal hydroxide in aqueous solution added thereto portionwise with stirring. Thereafter, the reaction mixture is heated for a period of time at temperatures up to about 100° C. to complete the reaction. The reaction mixture is cooled to precipitate the desired product and the latter is separated by filtration, washed with dilute aqueous acid and water and recrystallized from an organic solvent such as benzene or alcohol.

The compounds of the invention vary in their efficacy for controlling particular organisms and in the amounts required for parasiticidal activity. The compounds in which the R group in the aforementioned formula represents a tolyl or chlorophenyl radical have been found to be particularly effective for the control of bacteria such as Salmonella and Staphylococcus and of fungi such as Aspergillus and Rhizopus. Such compounds, wherein the phenyl group attached to the sulfur bears a methyl substituent or one or more chlorine substituents, constitute a preferred embodiment of the invention.

The compounds of the invention have also been found useful as active toxic ingredients in compositions for the control of insects such as, for example, flies, roaches and particularly chewing insects such as army worms and plantfeeding caterpillars.

The following examples illustrate the invention but are not to be construed as limiting the same.

Example 1

19.05 grams (0.1 mole) of p-toluenesulfonyl chloride and 19.65 grams (0.1 mole) of 2,4,5-trichloroaniline were dispersed in 100 milliliters of water at a temperature of 60° C. To the resulting mixture, a solution of 4 grams (0.1 mole) of sodium hydroxide in 50 milliliters of water was added portionwise with stirring during a period of 15 minutes while the mixture was maintained at temperatures of from 60° to 75° C. Thereafter, the mixture was heated at temperatures of 80° to 90° C. for 30 minutes to complete the reaction. The mixture was then cooled to precipitate the solid product and the latter separated by filtration, washed with water, dried and recrystallized from benzene to obtain the 2′,4′,5′-trichloro-p-toluene-sulfonanilide product as a crystalline solid, melting at 89°–91° C.

Example 2

13.75 grams (0.07 mole) of 2,4,5-trichloroaniline and 5.6 grams (0.07 mole) of pyridine were mixed with 75 milliliters of water and heated to 50° C. To the resulting mixture, 19.6 grams (0.07 mole) of 2,4,5-trichlorobenzenesulfonyl chloride was added portionwise with stirring. The addition of the chloride reactant was carried out over a period of 20 minutes while maintaining the reaction mixture at temperatures of from 55° to 65° C. Thereafter, the mixture was heated at 60°–70° C. for 2 hours to complete the reaction and cooled to precipitate the crude product. The latter was separated by filtration, washed with water, dried and recrystallized from alcohol to obtain the 2,2′,4,4′,5,5′-hexachlorobenzenesulfonanilide product, melting at 237°–240° C.

Example 3

39.3 grams (0.2 mole) of 2,4,5-trichloroaniline, 15.8 grams (0.2 mole) of pyridine and 120 milliliters of water are mixed together and heated to 50° C. To the resulting mixture, 49.1 grams (0.2 mole) of 2,4-dichlorobenzenesulfonyl chloride is added portionwise with stirring during a period of about 40 minutes while maintaining the reacton mixture at temperatures of 60° to 75° C. Thereafter, the reaction vessel and contents are heated for 2 hours at gradually increasing temperatures up to about 85° C. to complete the reaction and the crude product is separated and worked up is in Example 2 to obtain 2,2′,4,4′,5′-pentachlorobenzenesulfonanilide as a white, crystalline material, having a molecular weight of 395.5.

Example 4

33 grams (0.17 mole) of 2,4,5-trichloroaniline and 35 grams (0.17 mole) of 4-chlorobenzenesulfonyl chloride were melted together at 50° C. and a solution of 8 grams (0.2 mole) of sodium hydroxide in 30 milliliters of water added thereto portionwise with stirring over a period of 30 minutes while maintaining the reaction mixture at temperatures of from 70° to about 95° C. Thereafter, 100 milliliters of hot water was added and the mixture cooled to precipitate the crude product. The latter was separated by filtration, washed with water, dried and recrystallized from alcohol to obtain a 2′,4,4′,5′-tetrachloro-benzenesulfonanilide as a cream-colored, flaky, crystalline solid melting above 200° C.

Example 5

19.65 grams (0.1 mole) of 2,4,5-trichloroaniline and 7.9 grams (0.1 mole) of pyridine were mixed with 100 milliliters of water and heated to 50° C. To the resulting mixture, 17.66 grams (0.1 mole) of benzenesulfonyl chloride was added. The reaction was carried out and the product worked up as in Example 2 to obtain a 2',4',5'-trichlorobenzenesulfonanilide product as a crystalline solid melting at 138°–139° C.

*Example 6*

13.75 grams (0.07 mole) of 2,4,5-trichloroaniline was reacted with 14.45 grams (0.07 mole) of 4-methoxybenzenesulfonyl chloride in the presence of 5.6 grams (0.07 mole) of pyridine following the procedure of Example 2. The product was worked up as in Example 2 to obtain a 2',4',5'-trichloro-4-methoxybenzene-sulfonanilide melting at 146°–147° C.

*Example 7*

13.75 grams (0.07 mole) of 2,4,5-trichloroaniline was reacted with 15.4 grams (0.07 mole) of 4-ethoxy-benzenesulfonyl chloride in the presence of 5.6 grams (0.07 mole) of pyridine following the procedure of Example 2. The product was worked up as in Example 2 to obtain a 2',4',5'-trichloro-4-ethoxybenzenesulfonanilide melting at 141°–142° C.

In a similar fashion, 2-secondarybutyl-benzenesulfonyl chloride, 4-isopropyl-benzenesulfonyl chloride, 2-butoxybenzenesulfonyl chloride and 3,4-dichloro-benzenesulfonyl chloride may be reacted with 2,4,5-trichloroaniline to obtain the compounds 2',4',5'-trichloro-2-secondarybutyl-benzenesulfonanilide, 2',4',5'-trichloro-4-isopropylbenzenesulfonanilide, 2',4',5'-trichloro-2-butoxybenzenesulfonanilide, and 2',3,4,4',5'-pentachloro-benzenesulfonanilide, respectively.

2',4',5'-trichloro-p-toluenesulfonanilide, 2',4,4',5'-tetrachloro-benzenesulfonanilide and 2,2',4,4',5,5'-hexachlorobenzenesulfonanilide were separately dispersed in nutrient bacterial culture media to prepare media each containing one of said compounds at a concentration of 0.05 percent by weight. Separate portions of such media were inoculated with actively growing suspensions of *Staphylococcus aureus* and *Salmonella typhosa*. Portions of the nutrient media without admixture of any test compound were similarly inoculated to serve as untreated checks. All inoculated media were incubated at 37° C. for 24 hours and observed to determine the growth of the test organisms. In the untreated checks, vigorous growth occurred while in the media containing the sulfonanilide compounds there was substantially complete inhibition of growth.

Representative compounds of the invention were dispersed in water in finely divided form with the aid of wetting and dispersing agents to prepare aqueous dispersion compositions containing varying concentrations of one of the substituted benzenesulfonanilide compounds. The dispersion compositions were applied to individual cranberry bean plants so as to wet thoroughly the foliage of each plant with one of the dispersion compositions. Thereafter the leaf surfaces were allowed to dry and the plants were infested with a known number of southern army worm larvae. Three days after the infestation, the bean plants were examined and the following percentage kills observed.

| Compound | Concentration, Parts by Weight per Million Parts of Dispersion | Percent Control of Southern Army Worms |
|---|---|---|
| 2',4',5'-trichlorobenzene-sulfonanilide | 1,000 | 100 |
| 2',4',5'-trichlorobenzene-sulfonanilide | 500 | 100 |
| 2',4',5'-trichlorobenzene-sulfonanilide | 100 | 100 |
| 2',4,4',5'-tetrachlorobenzene-sulfonanilide | 500 | 100 |
| 2',4,4',5'-tetrachlorobenzene-sulfonanilide | 100 | 100 |
| 2,2',4,4',5,5'-hexachlorobenzene-sulfonanilide | 500 | 100 |

In further determinations such as the above, wherein the plants were not infested with the army worm larvae until a number of days after the application of the substituted benzenesulfonanilide compounds, it was found that the compounds possessed marked residual activity and continued to give high kills of the southern army worm larvae.

In a further operation, 100 percent kills of American cockroach were obtained when the insects were contacted with aqueous dispersions containing 2',4',5'-trichloro-p-toluenesulfonanilide, 2',4,4',5'-tetrachlorobenzenesulfonanilide or 2,2',4,4',5,5'-hexachlorobenzenesulfonanilide in finely divided form and at a concentration of one pound of the toxicant per 100 gallons of dispersion.

We claim:

1. 2',4',5'-trichloro-benzenesulfonanilides having the formula

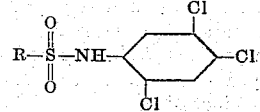

wherein R is selected from the group consisting of phenyl, lower alkylphenyl, lower alkoxyphenyl and chlorophenyl radicals.

2. 2',4',5'-trichloro-benzenesulfonanilide.
3. 2',4',5'-trichloro-p-toluenesulfonanilide.
4. 2',4,4',5'-tetrachloro-benzenesulfonanilide.
5. 2,2',4,4',5,5'-hexachloro-benzenesulfonanilide.
6. 2',4',5'-trichloro-4-methoxybenzenesulfonanilide.

References Cited in the file of this patent

Adams et al.: J. Am. Chem. Soc., vol. 74, pp. 3171–3 (1952).

Pezold et al.: J. Am. Chem. Soc., vol. 56, pp. 696–7 (1934).

Baxter et al.: Chemical Abstracts, vol. 10, pp. 883–884 (1916).

Boyle: Chemical Abstracts, vol. 4, p. 1025 (1910).

Schuloff et al.: Berichte der Deut. Chem. Gesell., vol. 62, p. 1852 (1929).

Beilstein: Handbuch der Organ. Chem., vol. 12, pp. 569 and 624 (1929).